United States Patent
Stevens et al.

(10) Patent No.: US 10,286,810 B2
(45) Date of Patent: May 14, 2019

(54) INTEGRATED SENSOR ARRANGEMENT FOR AUTOMATED AUXILIARY COMPONENT ADJUSTMENTS

(71) Applicant: NIO USA, Inc., San Jose, CA (US)

(72) Inventors: Colin Stevens, San Jose, CA (US); Geoffrey D. Young, San Jose, CA (US); Christopher Eckert, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 15/441,451

(22) Filed: Feb. 24, 2017

(65) Prior Publication Data

US 2018/0244285 A1 Aug. 30, 2018

(51) Int. Cl.
*B60N 2/00* (2006.01)
*B60W 40/08* (2012.01)
*B60N 2/02* (2006.01)

(52) U.S. Cl.
CPC .......... *B60N 2/002* (2013.01); *B60N 2/0224* (2013.01); *B60N 2/0244* (2013.01); *B60N 2/0248* (2013.01); *B60W 40/08* (2013.01); *B60N 2002/0268* (2013.01); *B60W 2040/0872* (2013.01); *G06T 2207/30196* (2013.01); *G06T 2207/30252* (2013.01)

(58) Field of Classification Search
CPC .... B60N 2/002; B60N 2/0248; B60N 2/0244; B60N 2/0224; B60N 2002/0268; B60W 40/08; B60W 2040/0872; G06T 2207/30196; G06T 2207/30252
See application file for complete search history.

(56) References Cited

U.S. PATENT DOCUMENTS

| | | | |
|---|---|---|---|
| 2013/0090816 A1* | 4/2013 | Huber | B60N 2/0248 701/49 |
| 2013/0218420 A1* | 8/2013 | Jendritza et al. | B60N 2/002 701/49 |
| 2013/0329960 A1* | 12/2013 | Sandahl et al. | G06T 2207/30196 382/104 |
| 2016/0280161 A1* | 9/2016 | Lippman et al. | B60N 2/002 |
| 2017/0269771 A1* | 9/2017 | Nam et al. | B60K 35/00 |
| 2017/0284819 A1* | 10/2017 | Donnelly | B60W 40/08 |

OTHER PUBLICATIONS

RAMIS—Digital Human Model—History and Capabilities. Andre Luebke; Apr. 28, 2010.

* cited by examiner

*Primary Examiner* — Dale W Hilgendorf
(74) *Attorney, Agent, or Firm* — Sheridan Ross P.C.

(57) ABSTRACT

A vehicle adjustment assembly including sensors for adjusting the position of an auxiliary component of the vehicle is disclosed. The sensor is connected to the vehicle and is configured to detect a user's characteristics. The sensor generates data regarding the user's characteristics, and a computer receives the data generated by the sensor related to the user's characteristics. The auxiliary system is adjusted via input signals from the computer in response to the data generated by the sensor.

20 Claims, 2 Drawing Sheets

INTEGRATED SENSOR ARRANGEMENT
FOR AUTOMATED AUXILIARY
COMPONENT ADJUSTMENTS

FIELD OF INVENTION

The present disclosure relates to using a vehicle sensor to generate data about a user of the vehicle, and using this data to improve occupant ergonomics and safety.

BACKGROUND

Vehicles include a variety of assemblies and arrangements designed to adjust auxiliary components of the vehicle. The term "auxiliary component" with respect to a vehicle is used herein broadly to refer to any sub-component within a vehicle, such as a rear-view mirror, acceleration pedal, brake pedal, shifting assembly, seat belt mechanism, steering wheel, ignition mechanism, combination switch for high beams, turn signals, and windshield wipers, seat positioning assembly, horn, etc. As a user enters a vehicle, it is desirable to adjust the positions of these auxiliary components so that the user can readily access all of the features of the vehicle. A reliable positioning system for the auxiliary components is critical for a user's comfort and safety.

One existing way to ensure a reliable positioning system is to include a stored user setting in a vehicle's central computer. The user can indicate their specific setting via the vehicle's central computer, and the associated position settings for a saved profile of the user can automatically be initiated by an adjustment assembly.

It would be desirable to provide a convenient system for users to provide their physical attributes to a vehicle's computer system.

SUMMARY

The present disclosure provides embodiments in which vehicle sensors are utilized to acquire characteristics about users of a vehicle. In particular, vehicle sensors are utilized to acquire data regarding the physical attributes and characteristics of users. Data regarding the user's characteristics is then processed by the vehicle's computer system, the computer systems uses this data to automatically adjust positions of auxiliary components of the vehicle.

DETAILED DESCRIPTION OF THE PREFERRED EMBODIMENTS

Figure 1:
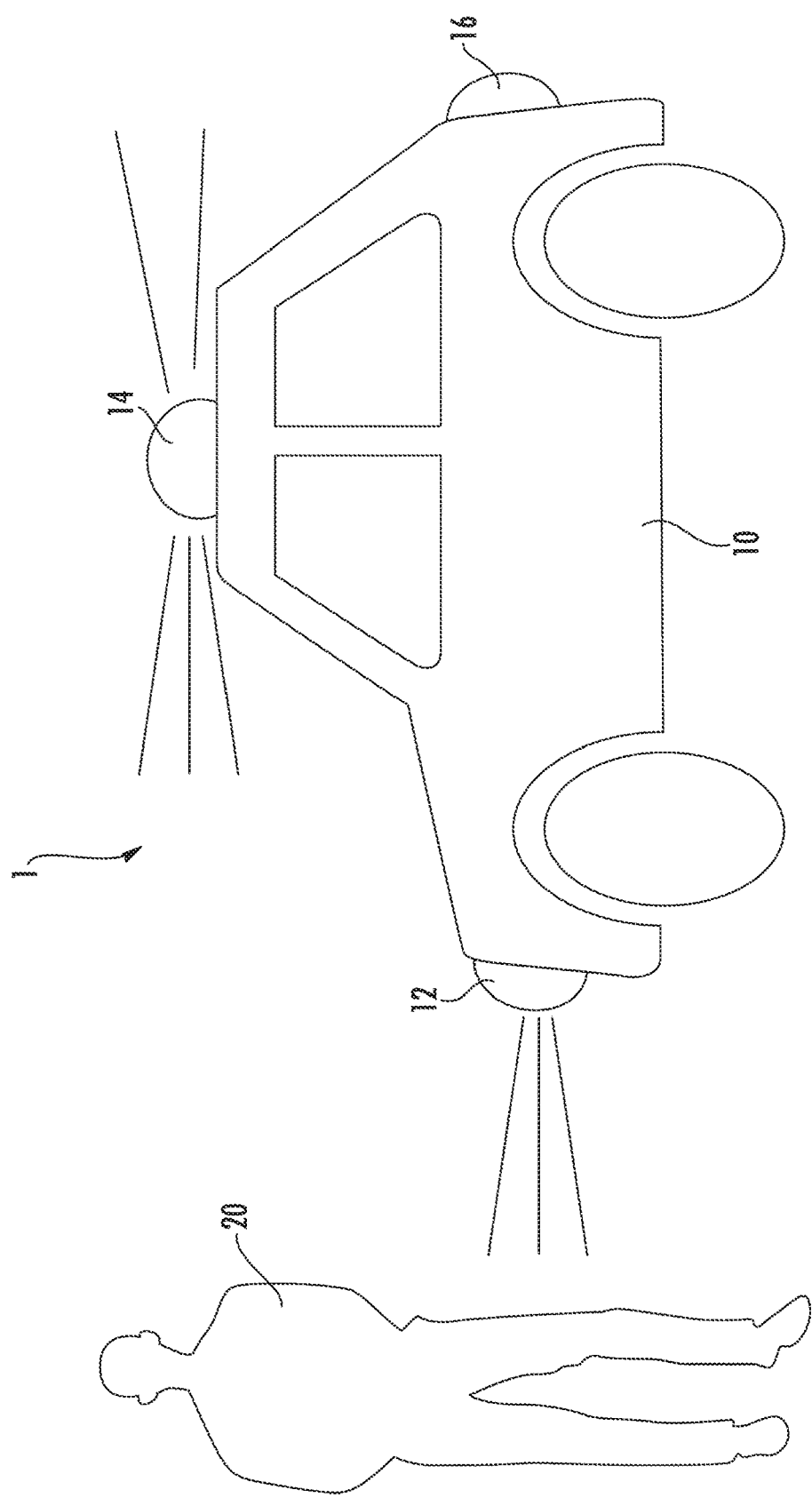
FIG. 1 is a schematic view of a system for vehicle including sensors.

FIG. 1 illustrates a system 1 including a vehicle 10 with sensors 12, 14, 16. The sensors 12, 14, 16 are typically used to scan and take measurements of objects surrounding the vehicle 10 in existing autonomous vehicles 10. The sensors 12, 14, 16 generate data that is processed by the vehicle 10, via a central computer. The vehicle 10 can send alerts, initiate braking, provide assisted steering, or take other action in response to the data from the sensors 12, 14, 16. The present system 1 utilizes these sensors 12, 14, 16 to generate data to assist in positioning components of the vehicle and/or to generate a three dimensional model of a user 20.

The sensors 12, 14, 16 are typically used in automated driver assistance systems (ADAS). ADAS can include a variety of types of sensors, including fine image scanning, such as ultrasonics, light detection and ranging (LIDAR), radar, stereoscopic cameras, thermal imaging, etc. Although three independent sensors 12, 14, 16 are illustrated in FIG. 1, one of ordinary skill in the art would recognize from the present disclosure that any number of sensors can be used, and the location of the sensors can be modified.

The system 1 of FIG. 1 uses the sensors 12, 14, 16 to analyze the user 20. Specifically, the user 20 can either stand stationary near the sensors 12, 14, 16, or the user 20 can walk around the vehicle 10 and allow the sensors 12, 14, 16 to obtain multiple angles and views of the user 20. The sensors 12, 14, 16 detect specific lengths of individual nodes of a user, such as a distance between a user's shoulder and hands, distance between a user's torso and head, etc.

A user's gait can be detected by the sensors 12, 14, 16, such that the system 1 obtains data regarding measurements of the user's body, the user's body mechanics, body proportions, etc. Gait analysis provides data that can be used to extrapolate a specific person's health, age, size, velocity, weight, density, ailments, posture, disorders, and many other physical characteristics. These measurements are generally called anthropometry measurements.

Figure 2:
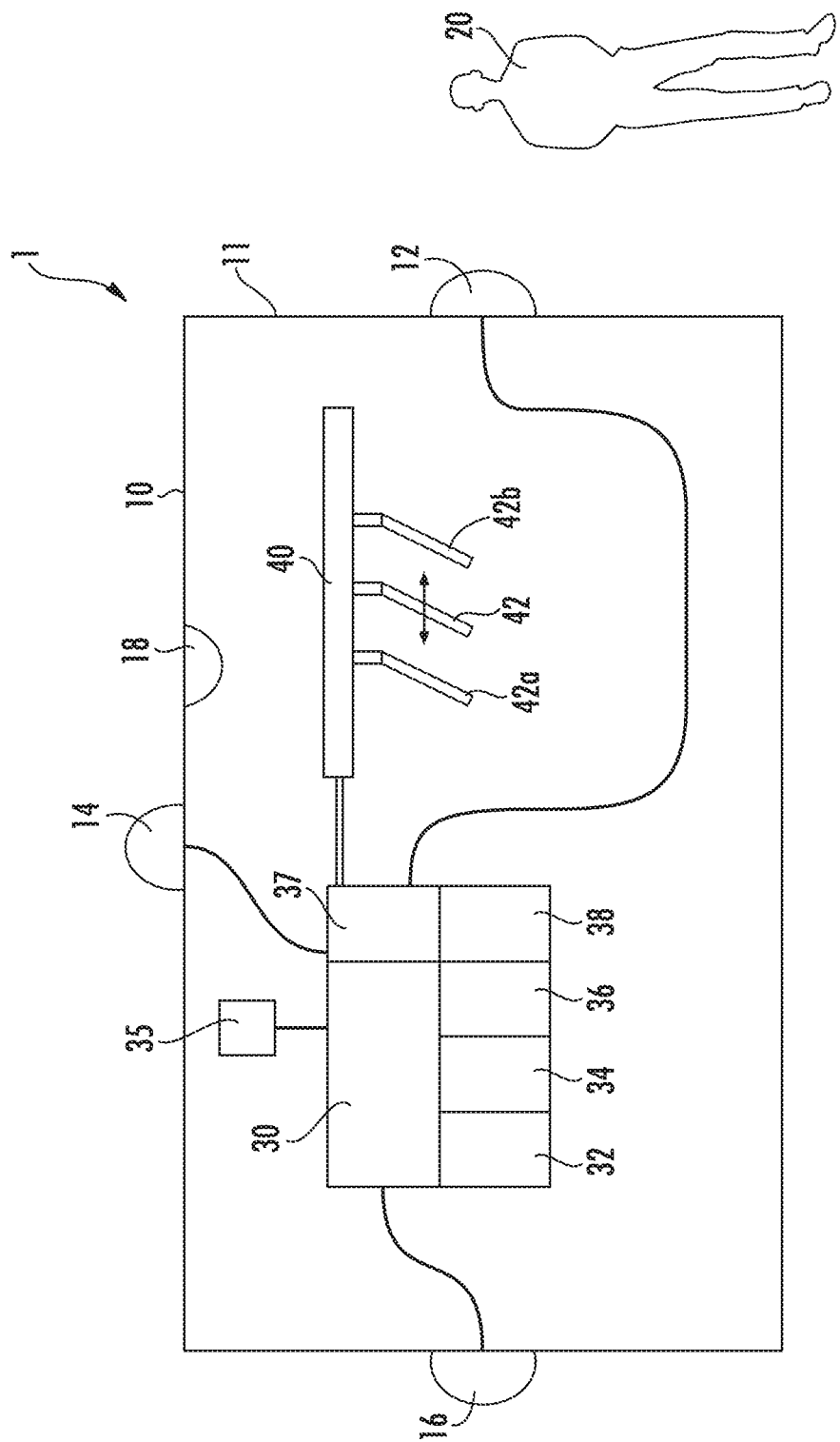
FIG. 2 illustrates a schematic view of the system and the vehicle's internal components.

The system 1 sends data from the sensors 12, 14, 16 to a central vehicle computer 30, which is illustrated in FIG. 2. As shown in FIG. 2, the vehicle computer 30 includes a memory unit 32, a processor 34, a power source 36, an input/output device 38, etc. In one embodiment, the sensors 12, 14, 16 are configured to provide data to the computer 30 such that the computer 30 creates a fully rendered three dimensional model, or avatar, of the user 20. In another embodiment, a simpler, two dimensional model is generated with specific values for a user's characteristics. The vehicle computer 30 includes a display 35 configured to display settings of the system 1 for the user so that the user can navigate and control the functions of the vehicle computer 30. A number of three dimensional models or avatars can be stored on the vehicle computer 30 for a plurality of users, and each user can select their specific avatar via the vehicle computer 30. The vehicle computer 30 can include any number of other components and can be specifically configured to process and analyze data in a matter consistent with the disclosed embodiments. In one embodiment, a remote server may perform the functions described above for the vehicle computer 30, and all of the data related to a user's characteristics are stored at the remote server. This configuration relies on a cloud-based arrangement to store the user's information away from the vehicle 10, such that the vehicle 10 can retrieve the user's information. This information could also be stored and maintained to perform studies regarding comfort and ergonomics of a user.

The central vehicle computer 30 analyzes data from the sensors 12, 14, 16, and sends signals related to the sensor data to an auxiliary system 40 within the vehicle 10 for adjustments. One auxiliary system 40 is illustrated in FIG. 2, which represents a pedal assembly. One of ordinary skill in the art will recognize from the present disclosure that multiple auxiliary systems 40 can be provided both inside and outside of the vehicle 10. Other known types of auxiliary systems include adjustment systems for a steering wheel, mirrors, and/or seat, engine controls, and any other auxiliary component within the vehicle 10. In one embodiment, the auxiliary system 40 includes the display 35 and an arrangement of touch buttons on the display 35. The system 1 can also rearrange a position of the touch buttons on the display 35 based on a specific user's characteristics detected by the sensors 12, 14, 16. The buttons can be arranged to provide improved visibility and improve the ability of a user to comfortably reach all of the buttons.

The auxiliary system 40 includes a pedal 42, which is shown in two different positions 42a, 42b in FIG. 2. The vehicle computer 30 uses data collected from the sensors 12, 14, 16 and analyzes the data to provide input signals to at least one of a plurality of auxiliary systems 40. For example, if the user is taller than an average person, then the sensors 12, 14, 16 will detect the taller user's height, and send data to the vehicle computer 30 that is indicative of the taller user's height. The vehicle computer 30 then sends input to the auxiliary system 40, which in FIG. 2 is a pedal arrangement, to move the pedal 42 from a first position indicated by 42a to a second position indicated by 42b. Here, the pedal 42 moves towards the front area 11 of the vehicle 10 to provide the user with more leg room. Similarly, if a user is shorter, then the pedal 42 moves towards position 42a, i.e. away from the front area 11 of the vehicle 10. One of ordinary skill in the art will recognize from the present disclosure that anthropometry measurements can be obtained for a sitting user. Anthropometry measurements for a user can vary depending on the user's posture, and users having the same height but different sized torsos can have different "comfortable reach zones" and "eye sight zones."

In one embodiment, the three dimensional model of the user stored by the vehicle computer 30 is used to automatically adjust a number of auxiliary components 40. For example, as soon as the user 20 approaches the vehicle 10, the sensors 12, 14, 16 detect a specific user based on stored profiles in the vehicle computer 30. The vehicle computer 30 accesses the specific user's three dimensional profile stored on the memory unit 32, and automatically directs the auxiliary components 40 to adjust positions based on the specific user's three dimensional profile.

One of ordinary skill in the art would recognize from the present disclosure that the embodiments disclosed above are just exemplary adjustments that can be provided for the system 1. One of ordinary skill in the art would recognize that a variety of other adjustments could be made based on data collected by the sensors 12, 14, 16.

The vehicle computer 30 can be linked to a centralized database by a wireless transmission and receiver unit 37 such as LTE, WiMax, 802.11 or similar technologies known in the art. In one embodiment, information from the vehicle computer 30 is sent to the centralized database in real time as the data is collected. Alternatively, the data is sent when the vehicle is returned to a home network. The home network can be a network found in a vehicle owner's home or garage or can be found at a charging or refueling station for the vehicle 10.

As shown in FIG. 2, the system 1 includes a sensor 18 arranged inside the vehicle 10. This sensor 18 can include the same types of sensors described above with respect to sensors 12, 14, 16. The sensor 18 is configured to sense conditions within the vehicle 10, i.e. a position of the seatbelt with respect to a user's torso and lap, a user's posture within the vehicle seat, a position of the user's head, a position of the user's eyes, etc. The sensor 18 can provide data to the vehicle computer 30 to make automatic adjustments of the auxiliary components 40 as described above. Alternatively, the system 1 can display an image via the display 35 indicative of a detected condition by the sensors 12, 14, 16, 18. For example, if a seat belt is too high or too low on a user's torso, the display 35 alerts the user to manually adjust the seat belt to a position that provides improved safety and/or comfort.

In one embodiment, the sensors 12, 14, 16 are not attached to or associated with the vehicle 10. In this embodiment, external sensors that are not connected to the vehicle 10 can be used to create a three dimensional model of the user 20 using a similar method described above. The three dimensional model of the user 20 can then be uploaded, via an external computer or network, to the vehicle computer 30 and adjustments of the auxiliary components 40 can be carried out as described above.

One of ordinary skill in the art would recognize from the present disclosure that the system 1 integrated into the vehicle 10 can also be implemented with non-sensor generated data. For example, in one embodiment, the user inputs their own characteristics, such as height, weight, waist size, arm length, leg length, etc. In one embodiment, a user can maintain detailed information regarding their characteristics, such as data obtained by a tailor or custom clothing vendor. This data can then be uploaded to the system 1 and the auxiliary components 40 of the vehicle 10 can be adjusted according to the user's characteristics.

Users typically shift in their seat and position during vehicle operations. One of ordinary skill in the art would recognize from the present disclosure that the system 1 can use anthropometry measurements to provide a baseline adjustment for vehicle components, and the system 1 can also provide dynamic or continuous adjustment inputs for when a user is operating a vehicle.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A vehicle adjustment assembly comprising:
    a sensor connected to a vehicle that detects physical characteristics associated with a body of a user and generate measurement data regarding distances between parts of the body of the user based on the detected physical characteristics;
    a computer that receives the measurement data generated by the sensor regarding the distances between parts of the body of the user and determines a reach zone for the user based on the measurement data; and
    an auxiliary system including touch buttons on a display, wherein a position of the touch buttons on the display are adjusted via input signals from the computer in response to determining the reach zone for the user such that the touch buttons on the display are adjusted to a position within the reach zone of the user;
    wherein the sensor detects that a seat belt of the vehicle is positioned too high or too low relative to a torso of the user, and wherein the display renders an alert for adjusting the seat belt to a predetermined position.

2. The vehicle adjustment assembly of claim 1, wherein the sensor includes a plurality of sensors.

3. The vehicle adjustment assembly of claim 1, wherein the sensor is further configured to detect a gait of the user and generate data regarding a health associated with the user.

4. The vehicle adjustment assembly of claim 1, wherein the auxiliary system includes a plurality of auxiliary systems, and the computer sends signals to each auxiliary system of the plurality of auxiliary systems for adjustments based on the measurement data generated by the sensor.

5. The vehicle adjustment assembly of claim 1, wherein the sensor is a light detection and ranging (LIDAR) sensor.

6. The vehicle adjustment assembly of claim 1, wherein the vehicle is an autonomous vehicle.

7. The vehicle adjustment assembly of claim 1, wherein the computer generates a three-dimensional model that is representative of the user based on the measurement data generated by the sensor.

8. The vehicle adjustment assembly of claim 7, wherein the computer stores a plurality of three-dimensional models that are representative of multiple users.

9. The vehicle adjustment assembly of claim 1, wherein the sensor is arranged on an external surface of the vehicle.

10. The vehicle adjustment assembly of claim 1, wherein the sensor is arranged on an internal surface of the vehicle.

11. A method of adjusting auxiliary components in a vehicle comprising:
- detecting physical characteristics associated with a body of a user and generating measurement data related to distances between parts of the body of the user based on the detected physical characteristics via a sensor;
- sending the measurement data generated by the sensor to a vehicle computer;
- determining, via the vehicle computer, a reach zone for the user based on the distances between parts of the body of the user in the measurement data; and
- adjusting an auxiliary component of the vehicle based on the measurement data from the sensor provided to the vehicle computer, wherein the auxiliary component includes touch buttons on a display, and wherein a position of the touch buttons on the display are adjusted to a position within the reach zone of the user;
- wherein the sensor detects that a seat belt of the vehicle is positioned too high or too low relative to a torso of the user, and wherein the display renders an alert for adjusting the seat belt to a predetermined position.

12. The method of claim 11, further comprising generating a three-dimensional model of the user based on the measurement data generated by the sensor.

13. The method of claim 12, further comprising adjusting the auxiliary component of the vehicle based on characteristics of the three-dimensional model of the user.

14. The method of claim 12, further comprising storing a plurality of three-dimensional models for different users based on the measurement data generated by the sensor.

15. A vehicle adjustment assembly comprising:
- a computer configured to receive measurement data associated with a body of a user of a vehicle and determine a reach zone for the user inside the vehicle based on the measurement data received; and
- an auxiliary system including touch buttons on a display inside the vehicle, wherein a position of the touch buttons on the display are adjusted via input signals from the computer in response to determining the reach zone for the user inside the vehicle such that the touch buttons on the display are adjusted to a position within the reach zone of the user;
- wherein a sensor of the vehicle detects that a seat belt of the vehicle is positioned too high or too low relative to a torso of the user, and wherein the display renders an alert for adjusting the seat belt to a predetermined position.

16. The vehicle adjustment assembly of claim 15, further comprising:
- a movement sensor inside the vehicle configured to detect when the user shifts in a seat of the vehicle while the user is operating the vehicle.

17. The vehicle adjustment assembly of claim 16, wherein the computer dynamically adjusts the auxiliary system as the user operates the vehicle.

18. The vehicle adjustment assembly of claim 17, wherein the auxiliary system includes a pedal, and wherein the pedal is adjusted by the computer system based on a height of the user.

19. The vehicle adjustment assembly of claim 15, wherein the alert includes information for the user to manually adjust the seat belt to the predetermined position.

20. The vehicle adjustment assembly of claim 15, wherein the measurement data associated with the body of the user is input to the computer via the user based on non-sensor generated body part measurements taken apart from the sensor of the vehicle.

* * * * *

UNITED STATES PATENT AND TRADEMARK OFFICE
CERTIFICATE OF CORRECTION

| | |
|---|---|
| PATENT NO. | : 10,286,810 B2 |
| APPLICATION NO. | : 15/441451 |
| DATED | : May 14, 2019 |
| INVENTOR(S) | : Colin Stevens et al. |

It is certified that error appears in the above-identified patent and that said Letters Patent is hereby corrected as shown below:

In the Claims

At Column 5, Line 44, please delete ":" and insert --;-- therein.

Signed and Sealed this
Twelfth Day of November, 2019

Andrei Iancu
*Director of the United States Patent and Trademark Office*